Patented Mar. 25, 1952

2,590,642

UNITED STATES PATENT OFFICE 2,590,642

SOLUTIONS OF POLYAMIDES IN SOLVENT MIXTURES

James Burton Nichols, Wilmington, Del., assignor to E. I. du Pont de Nemours and Company, Wilmington, Del., a corporation of Delaware No Drawing. Application December 16, 1948, Serial No. 65,720

10 Claims. (Cl. 260—33.4)

This invention relates to synthetic linear polyamides and more particularly to new and useful fluid compositions containing these polyamides.

Linear polyamides prepared from alpha-amino acids, for example, by the condensation polymerization with carbon dioxide evolution of the corresponding N-carboanhydride derivatives, exhibit varying solubilities in aromatic hydrocarbons. In general, however, solutions of these linear polyamides in aromatic hydrocarbons are extremely viscous even at relatively low concentrations. Thus Woodward and Schramm, J. Am. Chem. Soc. 69, 1551 (1947) report that benzene is a solvent for the copolyamide obtained from the polymerization of a mixture of the N-carboanhydrides of DL-beta-phenylalanine and L-leucine, giving extremely viscous solutions at low concentrations (intrinsic viscosity of approximately 10). According to Wesseley and Sigmund, Z. Physiol. Chem., 159, 102–119 (1926), the polyamide prepared from the N-carboanhydride of sarcosine (N-methylglycine) is soluble in water and in ethanol, but only to a limited extent, and with great difficulty in chloroform, phenol or acetic acid. Curtius, J. prakt. Chem., 125, 211–302 (1930) indicates that the polyamides obtained by polymerizing the N-carboanhydrides of leucine and valine are soluble in benzene, and that the polyamide prepared from the N-carboanhydride of alpha-aminoisoamylacetic acid is soluble in hot benzene.

As indicated by Woodward and Schramm, supra, the viscosities of solutions of relatively high molecular weight alpha-amino acid polyamides are extremely high in the solvents employed. Since this type of polymer, i. e., one with relatively high molecular weight, is of preeminent interest and utility in fiber and film outlets and since it is convenient in the production of these fibers and films to handle these polyamides as solutions, i. e., to cast films and to spin fibers from solution, this problem of extremely high viscosities at relatively low polymer concentrations represents a major drawback in the utilization of these polyamides.

In copending applications, Serial Nos. 778,455 and 778,456, filed October 7, 1947, now U. S. Patents 2,516,162 and 2,517,610 respectively, by C. W. Tullock, the superior solvent properties, as judged by improved fluidity over other known solvents, of selected halogenated hydrocarbons and selected alicyclic ketones for alpha-amino acid copolymers are disclosed. However, the problem of high viscosities at relatively low polymer concentrations and the concomitant difficulties and inconveniences in the preparation of films and fibers therefrom still remain with the solutions of linear polyamides of alpha-amino acids in the cheaper and thus more desirable aromatic hydrocarbons and even in the relatively inexpensive and readily available halogenated hydrocarbons when the polyamide is of a sufficiently high degree of polymerization (DP) to be of value in the preparation of films and fibers. When the polyamide is of a DP of at least 25, the high viscosities of its solutions are definitely noticeable, especially with solutions in aromatic hydrocarbons, and when the DP of the polyamide is 50 to 60 or greater, the viscosities of its solutions, even at low solids concentrations, especially in aromatic hydrocarbon solvents are so high as to make them essentially unhandleable. When the polyamide is of a DP of 100 or greater, the viscosities of its solutions even at low solids concentrations and in the more effective halogenated hydrocarbon solvents are again so high as to make them almost unhandleable.

This invention has as an object the provision of solutions, of increased fluidity, of synthetic linear polyamides of alpha-amino acids. Another object is the preparation of such solutions of decreased viscosity. Other objects will appear hereinafter.

These objects are accomplished by the present invention of a solution of a synthetic linear polyamide of an alpha-amino acid wherein the recurring units of the polymer consist of alphaamino acid units and the chain of the polymer consists of the recurring chain

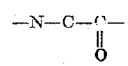

e. g. a polymer prepared by condensation, with attendant carbon dioxide evolution, of one or more alpha-amino acid N-carboanhydrides, in a solvent, or solvents, therefor, of energy density (E. D.) less than 95, containing a minor amount of another organic compound, or compounds, soluble in, or miscible with, said solvent or solvents and having an energy density above 95.

In the preferred practice of this invention, fluid solutions are obtained by dissolving 0.5 to 25.0% of the alpha-amino acid polyamide (by weight of the solution) in a solvent mixture consisting of a solvent for the polymer, such as a halogenated hydrocarbon, or an aromatic hydrocarbon, or a mixture thereof, normally liquid at 25° C., of boiling point not over 300° C. and of energy density less than 95, and 0.5 to 25.0% by weight of the solution of an organic compound of energy density greater than 95.

Energy density is defined in units of calories per cubic centimeter and is a physical property, specific for each compound, which is represented numerically by the result obtained in dividing the energy of vaporization of the compound at 25° C. in calories per mole by its molal volume also at 25° C. as set forth by Hildebrand on pages 103 and 106 of the Second Edition of "Solubility of Non-Electrolytes" published in 1936 by Reinhold. In all cases throughout this specification, the energy of vaporization at 25° C. ($\Delta E_{298}$) is calculated from the following equation:

$$\Delta E_{298} = 5280 + 24.5 t_b$$

where $t_b$ is the normal boiling point of the compound in question on the centigrade scale. This equation is given as Equation 24 on page 103 of the above-identified reference. A table of the energy density of various compounds is given at pages 104 and 105 of Hildebrand, supra.

The term "inherent viscosity" or $\eta_{inh.}$, as used herein, is defined by the following equation:

$$\eta_{inh.} = \frac{ln \eta_{rel.}}{C}$$

wherein $ln$ represents the natural, or Napierian logarithm, C is concentration of solute in grams per 100 cc. of solution and $$\eta_{rel.} = \frac{\eta_{solution}}{\eta_{solvent}}$$

In the examples, $\eta_{inh.}$ refers to results obtained with the polyamide dissolved in m-cresol at a concentration of 0.5 gram per 100 cc. of solution at 25° C.

The term "intrinsic viscosity" or $[\eta]$, as used herein, is defined by the following equation:

$$[\eta] = C \stackrel{lim}{\to} 0 \frac{ln \eta_{rel.}}{C}$$

wherein $ln \eta_{rel.}$ is as given above.

The following examples in which parts are by weight are illustrative of the invention.

Example I

A copolyamide (DP about 50 to 60) of L-leucine and DL-beta-phenylalanine is prepared by polymerizing in benzene solution at room temperature for nine days a 1:1 by weight mixture of the respective N-carboanhydrides and subsequently isolating the copolyamide so formed. A solution of this copolyamide in benezene is prepared at a concentration of 0.36 gram per 100 cc. of solution. The viscosity of a 19 cc. aliquot of this solution is measured in a calibrated Ubbelohde viscosimeter at room temperature. The time of flow is 640 seconds, whereas the time of flow of solvent alone (another sample from the same batch of benzene from which the solution was prepared) is 61 seconds in the same viscosimeter. Thus, the relative viscosity of the solution containing the polyamide is 10.5 (i. e., the ratio of the respective times of flow, 640/61). One cc. of m-cresol (E. D.=98) is added to the solution in the viscosimeter and the resulting solution carefully mixed. The time of flow for this new solution is 181 seconds in the same viscosimeter, whereas the time of flow for a solution prepared from 19 cc. of benzene and one cc. of m-cresol taken from the same batches as previously used, is 64.5 seconds. Thus, the relative viscosity of the solution containing the polyamide and the added small quantity of m-cresol is 2.81 (i. e., the ratio of the respective times of flow 181/64.5). Although the concentration of polyamide in the original benzene solution is 0.36 g. per 100 cc. of solution and that of the polyamide solution with the added m-cresol is 0.342 g. per 100 cc. of solution, i. e., only a 5% decrease in concentration, there is unexpectedly an almost 400% decrease in relative viscosity. There is therefore a profound decrease in viscosity of the solution of the polyamide in benzene (E. D.=81.7) obtained by the addition of approximately one per cent of m-cresol of energy density 98.

Example II

Thirteen and three-tenths (13.3) parts of the copolyamide ($\eta_{inh.}$=0.70, DP greater than 100), prepared by polymerizing in benzene solution at 55 to 80° C. for from 1.5 to 3.5 days a 1:1 by weight mixture of the N-carboanhydrides of L-leucine and DL-beta-phenylalanine and subsequently isolating said copolyamide, is dissolved in 615 parts of benzene by stirring at room temperature. The resulting solution is extremely viscous and can hardly be flowed. Fifteen parts of m-cresol is added in three five-part portions and the solution stirred and heated on a water bath at 45-50° C. after each addition. Marked improvement in the fluidity of the solution is noted after each such addition. When the fifteen parts is added, the solution becomes fluid enough for wet-spinning, whereas the original benzene solution and another benzene solution made up in the same concentration from another sample of the same batch of copolyamide with an added fifteen parts of benzene are much too viscous for such a procedure.

The solution is maintained at 60° C. for twelve hours and then cooled to room temperature and wet-spun into 20 filament yarn by extrusion at room temperature through a 20 hole spinneret plate into a coagulating bath of methanol, i. e., a non-solvent for the polyamide. The fibers so formed are stretched 98% in air after leaving the coagulating bath and then wound on bobbins. Residual m-cresol is removed by immersing the bobbins carrying the fibers in boiling methanol for a period of one hour. After drying the resulting fibers exhibit a tenacity of 1.5 grams per denier and an elongation of 21%. X-ray diagrams show the fibers to be oriented along the fiber axis.

If desired, in the case of compositions of this invention containing a phenolic type viscosity depressant, coagulation may be carried out utilizing as the coagulation medium a solution of an organic or an inorganic base, or bases, in a non-solvent for the polyamide, or polyamides involved. Thus there may be employed a 5% solution of potassium hyrdoxide in methanol.

Example III

Fifteen and seven-tenths (15.7) parts of the copolyamide ($\eta_{inh.}$=0.84, DP greater than 100), prepared by polymerizing in benzene solution at 55° C. for 3.5 days a 1:1 by weight mixture of the N-carboanhydrides of L-leucine and DL-beta-phenylalanine and subsequently isolating said copolyamide, is added to 62.5 parts of benzene and 21.8 parts of 98-100% formic acid (E. D.=204), and the mixture stirred and warmed slightly. The clear, viscous, homogeneous solution so obtained can be flowed slowly at room temperature. Upon warming to about 60° C. in a steam bath for a short time the solution becomes markedly more fluid and is readily flowed in a thin layer onto a glass plate. The benzene and formic acid are evaporated at room temperature, residual formic acid is extracted by immersion in a methanol bath, and the resulting film removed from the casting surface. There is thus obtained a clear, homogeneous, strong, flexible, self-supporting film.

Another 15.7 part sample of the same batch of copolyamide is mixed with 84.3 parts of benzene to give the same solids concentration as in the above solution. Despite vigorous stirring and warming, a completely homogeneous solution is not obtained. The composition is so viscous that efficient mixing is not possible, and further, it is non-flowable at both room temperature and 60° C.

*Example IV*

Two parts of the copolyamide ($\eta_{inh.}$=0.2, DP of about 50-60), prepared by polymerizing in benzene solution at room temperature for nine days a 1:1 by weight mixture of the N-carboanhydrides of L-leucine and DL-beta-phenylalanine and subsequently isolating said copolyamide, is dissolved in 98.0 parts of benzene by stirring and gentle warming. The solution upon cooling to room temperature exhibits a viscosity of 314.0 seconds on the Gardner-Holdt scale.

Another two-part sample from the same batch of copolyamide is dissolved in a mixture of 96.9 parts of benzene and 1.1 part of N,N'-dimethylacetamide (E. D.=101) by gentle stirring and warming. Upon cooling to room temperature, the solution exhibits a viscosity of 9.5 seconds on the Gardner-Holdt scale. Thus, there is evidenced approximately a 33-fold decrease in the viscosity of the solutions at the same solids concentration through the addition of the small amount of N,N'-dimethylacetamide.

*Example V*

Two and one-tenth parts (2.1) of the copolyamide ($\eta_{inh.}$=0.18, DP of about 50-60), prepared by polymerizing in benzene solution at 55° C. for two days a 1:1 by weight mixture of the N-carboanhydrides of L-leucine and DL-beta-phenylalanine and subsequently isolating said copolyamide, is dissolved in 97.9 parts of benzene by gentle stirring and warming. Upon cooling to room temperature, the solution exhibits a viscosity of 175.0 seconds.

Another 2.1 part sample of the same batch of copolyamide is dissolved by gentle stirring and warming in a mixture of 94.3 parts of benzene and 3.6 parts of mixed N-ethyl-o- and p-toluene sulfonamides. Upon cooling to room temperature the solution exhibits a viscosity of 2.8 seconds.

The viscosity figures given in this example are obtained by filling a 10x75 millimeter glass test tube to within about 13 millimeters of the top with the solution to be tested, inserting a cork stopper so that the bottom face of the stopper is about 6.5 millimeters from the top of the liquid thereby leaving about a 6.5 millimeter air space, inverting the tube, and measuring the time necessary for the bubble to reach the top of the inverted tube.

*Example VI*

Two and one-half (2.5) parts of the copolyamide (prepared as described in the copending application of Robert N. MacDonald, Serial No. 778,459, of October 7, 1947, now U. S. Patent No. 2,572,842) from a 1:2 by weight mixture of the N-carboanhydrides of DL-alanine and 2-amino-4,6,6-trimethylheptanoic acid (synthetic product and a mixture of DD, LL, LD, and DL forms) is dissolved in 97.5 parts of chlorobenzene (E. D.=83.8)

by stirring and gentle heating. Upon cooling to room temperature there is obtained a homogeneous, slightly hazy solution which exhibits a viscosity of 20 seconds on the Gardner-Holdt scale. Another 2.5 part sample from the same batch of copolyamide is dissolved in a mixture of 94.6 parts chlorobenzene and 2.9 parts m-cresol by stirring and gentle warming. After cooling to room temperature there is obtained a homogeneous, very slightly hazy solution exhibiting a viscosity of 1.1 seconds on the Gardner-Holdt scale.

*Example VII*

One and five-hundredths (1.05) parts of the copolyamide ($\eta_{inh.}$=1.93 in chloroform at 1% concentration) prepared as described in MacDonald Serial No. 778,459, from a 2:1 by weight mixture of the N-carboanhydrides of 2-amino-4,6,6-trimethylheptanoic acid and DL-alanine is dissolved in 141.2 parts of trichloroethylene (E. D.=82) by stirring at room temperature. There is obtained a clear, rather fluid composition exhibiting a viscosity of 14 centipoises on the Gardner-Holdt scale.

Another 1.05 part sample from the same batch of copolyamide is dissolved in a mixture of 0.5 part guaiacol (o-methoxyphenol) [E. D.=107] and 140.7 parts trichloroethylene. This solution is markedly more fluid than the solution containing no added guaiacol and exhibits a viscosity of 6.2 centipoises on the Gardner-Holdt scale. These results are all the more unexpected and novel since the copolyamide is insoluble in guaiacol alone even at temperatures as high as 205° C., the boiling point og guaiacol at 760 mm.

*Example VIII*

One (1) part of the copolyamide prepared as described in the above MacDonald application from a 1:1 by weight mixture of the N-carboanhydrides of L-leucine and 2-amino-4,6,6-trimethylheptanoic acid is dissolved in 49 parts of trichlorcethylene. There is obtained a clear, homogeneous, difficultly-flowable composition. Five (5) parts of guaiacol (o-methoxyphenol)

[E. D.=107]

is added and a clear, readily flowable, homogeneous solution obtained by thorough mixing and gentle warming. The resulting solution is considerably more fluid than the original solution which is essentially non-flowable or another trichloroethylene solution made up in the same concentration from another sample of the same batch of copolyamide with five added parts of trichloroethylene and is easily flowed in a thin layer onto a glass plate at room temperature. After evaporation of the trichloroethylene at room temperature and extraction of the residual guaiacol in a methanol bath followed by air drying and subsequent removal of the resulting films, there is obtained a clear, flexible, strong, homogeneous, self-supporting film.

These results are all the more unexpected and novel since the copolyamide is completely insoluble in guaiacol alone even at temperatures as high as 205° C., the boiling point of guaiacol at 760 mm.

*Example IX*

One and nine-tenths (1.9) parts of L-leucine homopolymer, prepared by polymerizing L-leucine N-carboanhydride in benzene solution at room temperature for 24 hours and subsequently isolating said homopolyamide, is stirred in 40 parts of refluxing benzene until the polymer dissolves. There is obtained a clear, homogeneous but very viscous and barely flowable solution. Upon adding 8.16 parts of 95% ethyl alcohol (E. D.=123) and thoroughly mixing the resulting composition, there is obtained a clear, homogeneous solution of markedly decreased viscosity which can be readily flowed.

Example X

Three and three-tenths (3.3) parts of DL-alpha-aminoisocaproic acid homopolyamide ([η]=1.77, DP greater than 100), prepared by polymerizing the N-carboanhydride of the amino acid in benzene solution at 65° C. for 137 hours is dissolved in 96.7 parts of chloroform by stirring and gentle warming. There is obtained a clear, homogeneous, viscous solution whose viscosity, as determined by a MacMichael viscosimeter at 6 R. P. M. and 25° C. is 189 poises. Upon adding one part of glycolonitrile (E. D.=178) and thoroughly mixing the resulting composition, there is obtained a clear, homogeneous, solution whose viscosity as measured in the same manner as given above is 7.8 poises.

The solvent mixtures most advantageously used in the practice of this invention are those containing at least one halogenated hydrocarbon or aromatic hydrocarbon of energy density less than 95, which is normally liquid (i. e., liquid at 25° C.) and of boiling point below 300° C., or mixtures thereof, with at least one other organic compound whose energy density is greater than 95. The halogen of these halogenated hydrocarbons is preferably chlorine. Of these halogenated hydrocarbons particularly useful are those of one to six carbons; of the aromatic hydrocarbons particularly useful are those of six to eleven carbons.

Among the halogenated hydrocarbons other than those given in the examples which can be used in this invention, there may be mentioned alkyl halides, for example, propyl iodides, butyl chlorides, tertiary amyl chlorides, etc.; alkenyl halides, for example, methallyl chloride, tetrachloroethylene, etc.; cycloalkyl halides, for example, cyclohexyl chloride, etc.; halogenated aromatic hydrocarbons, for example, meta-bromotoluene, alpha-bromonaphthalene, etc.; halogenated aralkyl hydrocarbons, for example, benzal chloride and benzotrichloride, etc.; and polyhalogenated non-benzenoid hydrocarbons, for example, ethylene chloride, 1,2,3-trichloropropane, etc.

Examples of aromatic hydrocarbons, i. e., hydrocarbons containing an aromatic nucleus, in addition to those mentioned previously which can be used in this invention are: alkyl substituted aromatic hydrocarbons, for example, the xylenes and other liquid polymethylbenzenes such as mesitylene, ethylbenzene, diethylbenzene, isopropylbenzene, isobutylbenzene; liquid alkyl-substituted bicyclic aromatic hydrocarbons, e. g., alpha-methylnaphthalene, liquid bicyclic aliphatic-aromatic hydrocarbons for example, tetrahydronaphthalene; liquid cycloaliphatic-substituted aromatic hydrocarbons, e. g., cyclohexylbenzene.

Among the organic compounds of energy density greater than 95 which can be used singly or in mixtures in conjunction with the aromatic and/or halogenated hydrocarbons mentioned above to produce the improved solvent mixtures for the amino acid polyamides, it is preferred to use hydroxyl-containing organic compounds, for example, the phenols, alcohols and carboxylic acids. These compounds may contain water. In fact, a small amount of water (0.1 to 2.0% based on the weight of the final solution) in addition to the solvent of energy density less than 95 and the viscosity depressant of energy density greater than 95 is beneficial.

To further illustrate the phenolic compounds which can be used in this invention, there may be mentioned: halogenated phenols, e. g., p-bromophenol, p-chlorophenol; polyhalogenated phenols, for example, 2,4-dibromophenol; alkylphenols, e. g., methylphenol, propylphenol; alkoxy phenols, for example, resorcinol monomethyl ether; polyphenols, e. g., pyrogallol, hydroquinone, resorcinol, pyrocatechin; bicyclic phenols, for example beta-naphthol. Of these phenols for reasons of improved depressant action, it is preferred to use the monocyclic phenols of not more than nine carbon atoms, which may have nuclear halogen substituents.

As examples of alcohols other than those previously given which can be used in the solvent mixtures of this invention there may be mentioned primary monoalcohols, for example, propyl alcohol, secondary monoalcohols, e. g., isopropyl alcohol; glycols, for example, ethylene glycol, the dihydroxy butanes; polyhydric alcohols, e. g., glycerol and mannitol; unsaturated alcohols, for example, crotyl alcohol, allyl alcohol; heterocyclic alcohols, e. g., furfuryl alcohol; substituted alcohols, for example, ethylene chlorohydrin, glycolonitrile. Of these alcohols it is preferred for reasons of high depressant action at relatively low concentrations to use the lower molecular weight hydroxy alkanes, i. e., those containing no more than three carbon per hydroxyl group, preferably the alkanols of not more than three carbons.

Especially preferred for reasons of high depressant action, coupled with good solubilities, are the lower molecular weight alkanols, i. e., those containing no more than three carbon atoms.

As additional illustrations of the carboxylic acids than can be used in this invention, there may be mentioned primary aliphatic monocarboxylic acids, e. g., propionic acid, butyric acid, substituted primary aliphatic monocarboxylic acids, for example, levulinic acid, lactic acid, dichloroacetic acid; secondary aliphatic monocarboxylic acids, e. g., isobutyric acid; aromatic monocarboxylic acids, for example, benzoic acid; substituted aromatic monocarboxylic acids, e. g., toluic acid; aromatic polycarboxylic acids, e. g., phthalic acid; aliphatic polycarboxylic acids, e. g., phthalic acid; aliphatic polycarboxylic acids, for example, succinic acid, glutaric acid; unsaturated aliphatic monocarboxylic acids, e. g., crotonic acid; unsaturated aliphatic polycarboxylic acids, e. g., maleic acid; substituted aliphatic polycarboxylic acids, e. g., malic acid, citric acid. Of these carboxylic acids for reasons of superior depressant action (i. e., greater viscosity reduction) at relatively low concentrations it is preferred to use the lower molecular weight alkane carboxylic acids, i. e., those containing no more than three additional carbon atoms for each carboxyl group. Especially preferred for reasons of high depressant action coupled with good solubility are the low molecular weight alkanoic acids, i. e., those containing no more than four carbon atoms including the carbon of the carboxyl group.

The following tabular data further illustrate the compositions of this invention, utilizing selected copolymers with varying values of $\eta_{inh.}$, obtained by polymerizing 1:1 by weight mixtures of the N-carboanhydrides of L-leucine and DL-beta-phenylalanine under varying conditions. In this table "viscosity in seconds" unless otherwise indicated, refers to the time required for the standard size bubble in a Gardner-Holdt viscosity tube to flow from the bottom to the top of the tube;

"Visc. Dep." refers to the viscosity depressants, and, as previously mentioned, "E. D." refers to energy density and "$\eta_{inh}$." to inherent viscosity. The (1) for the energy density for chloral hydrate is the closely related cohesive energy density in units of calories per cubic centimeter defined as the result obtained in dividing the latent heat of evaporation of the compound at constant volume in calories per mole by its molal volume in cubic centimeters, as set forth by Gee in Transactions of the Institution and Rubber Industry, vol. 18, pages 266–81, particularly at page 267. Chloral hydrate does not have a true boiling point as it decomposes. The (2) following the last five viscosities in the table indicates that these viscosities were determined by the method given in Example V.

| Parts of Polymer | $\eta_{inh}$ of Polymer | Solvent | Parts of Solvent | Added Visc. Dep. | Parts of Added Visc. Dep. | E. D. of Visc. Dep. | Visc. in Seconds |
|---|---|---|---|---|---|---|---|
| 2.0 | 0.20 | Benzene | 98.0 | | | | 40.0 |
| 2.0 | 0.20 | do | 96.8 | β-Methoxyethanol | 1.2 | 106 | 8.0 |
| 1.0 | 0.58 | Chloroform | 99.0 | | | | 20.0 |
| 1.0 | 0.58 | do | 97.4 | Acetic Acid | 1.6 | 142 | 3.3 |
| 2.0 | 0.16 | Benzene | 98.0 | | | | 63.2 |
| 2.0 | 0.16 | do | 96.0 | Dichloroacetic Acid | 2.0 | 121 | 0.6 |
| 1.15 | 0.48 | do | 98.85 | | | | 50.5 |
| 1.15 | 0.48 | do | 97.70 | Tetramethylene Sulfone | 1.15 | 126 | 30.5 |
| 3.4 | 0.84 | Chloroform | 96.6 | | | | 58.5 |
| 3.4 | 0.84 | do | 95.2 | Methanol | 1.4 | 168 | 44.0 |
| 4.2 | 0.15 | Benzene | 95.8 | | | | 146.2 |
| 4.2 | 0.15 | do | 94.3 | Chloral hydrate | 1.5 | 252 (1) | 2.1 |
| 1.15 | 0.48 | do | 98.85 | | | | 50.5 |
| 1.15 | 0.48 | do | 97.70 | N,N'-Dimethylformamide | 1.15 | 117 | 2.4 |
| 3.9 | 0.84 | Chloroform | 124.4 | | | | 68.8 |
| 3.9 | 0.84 | do | 120.5 | m-Cresol | 3.9 | 98 | 11.7 |
| 2.45 | 0.15 | Benzene | 97.55 | | | | 246.0 |
| 2.45 | 0.15 | do | 96.55 | Acetonitrile | 1.0 | 138.5 | 76.0 |
| 2.0 | 0.20 | do | 98.0 | | | | 420.0 |
| 2.0 | 0.20 | do | 96.8 | Benzonitrile | 1.2 | 96.5 | 270.0 |
| 2.2 | 0.18 | do | 101.4 | | | | 175.0(2) |
| 2.20 | 0.18 | do | 97.8 | Benzyl alcohol | 3.6 | 96 | 9.9(2) |
| 2.2 | 0.18 | do | 97.8 | Formic acid (90%) | 3.6 | 204 | 0.9(2) |
| 2.2 | 0.18 | do | 97.8 | Ethyl alcohol (95%) | 3.9 | 123 | 4.0(2) |
| 2.2 | 0.18 | do | 97.8 | Acetic acid | 3.9 | 142 | 5.0(2) |

The following tabular data further illustrate the compositions of this invention utilizing samples of a homopolymer of DL-alpha-aminoisocaproic acid ($[\eta]=1.77$), obtained by polymerizing the N-carboanhydride of the acid in benzene solution at 65° C. for 137 hours. In this table all viscosities in poises refer to results obtained utilizing a MacMichael viscosimeter at 6 R. P. M. at 25° C. In all instances the solutions contain 3.3 parts of the homopolyamide dissolved in 96.7 parts of chloroform.

| Added Viscosity Depressant | Percent Added Depressant | E. D. of Viscosity Depressant | Viscosity in Poises |
|---|---|---|---|
| None | 0 | | 189 |
| Glycolonitrile | 5 | 178 | 4.8 |
| m-Cresol | 1 | 98 | 16.5 |
| Do | 5 | 98 | 5.1 |
| Phenol | 1 | 110 | 9.6 |
| Do | 5 | 110 | 2.4 |
| Formic acid | 1 | 204 | 8.3 |
| Do | 5 | 204 | 3.2 |
| Methanol | 1 | 168 | 20.5 |
| Do | 5 | 168 | 5.9 |

Solutions of the synthetic linear alpha-amino acid polyamides in the solvent mixtures of this invention can be prepared at a given solids concentration in less time if the synthetic linear polyamide is finely divided and/or the resulting mixture of synthetic linear polyamide and a solvent mixture of this invention is heated.

The present invention is generic to the depression of the viscosity of solutions of synthetic linear alpha-amino acid polyamides in organic solvents of energy density less than 95 by means of organic compounds of energy density greater than 95. Preferred for reasons of lack of complicating side effects are the polymers and copolymers of polymerizable alpha-amino acids, which but for the amino and carboxyl groups are hydrocarbon in nature. These polymers are most conveniently obtained by the condensation, with carbon dioxide evolution, of one or more N-carboanhydrides of the amino acids.

Synthetic alpha-amino acid polyamides which may be used in preparing the compositions of improved fluidity of this invention include the polyamides and copolyamides from the following alpha-amino acids in addition to those given in the foregoing examples: 1-aminocyclohexanecarboxylic acid, alpha-aminoisobutyric acid, glycine, alpha-aminocyclohexylacetic acid, 3-aminotetrahydrothiophene-3-carboxylic acid, 1-amino-3,3,5-trimethylcyclohexanecarboxylic acid, 3-aminotetrahydrofuran-3-carboxylic acid, 1-aminocyclopentanecarboxylic acid, 1-aminocycloheptanecarboxylic acid, valine, norleucine, isoleucine, DL-leucine, proline, pipecolic acid, tryptophan, methionine, tyrosine, cystine, lysine, histidine, glutamic acid, sarcosine, N-phenylglycine or in brief, the polyamides and copolyamides from polymerizable alpha-amino acids or any polymerizable derivatives thereof.

The compositions of this invention are less pseudoplastic or dilatant than without the added organic compound, i. e., more closely approximate theoretical Newtonian behavior than do compositions made up in the same fashion without the added organic compound of E. D. greater than 95. By "Newtonian" is meant a solution whose apparent viscosities, measured at varying rates of applied shear, are constant and further remain constant with time at any increased rate of shear. These results are well illustrated by the following table listing viscosity data obtained with a MacMichael viscosimeter on a 3% by weight solution in chloroform of a copolyamide prepared from a 1:1 by weight mixture of the N-carboanhydrides of DL-leucine and alpha-aminoisobutyric acid. The viscosity depressant additive in each case is added in the amount 1% by weight based on the solvent.

| Viscosity Depressant Additive | Energy Density | Viscosity in Poises at 48 R. P. M. | Ratio of Viscosity in Poises at 6 R. P. M. to That at 48 R. P. M. |
|---|---|---|---|
| None-control | 80 | 266.0 | 1.69 |
| Phenol | 110 | 1.9 | 1.10 |
| Glycolonitrile | 178 | 1.1 | 0.61 |
| Nitromethane | 144 | 182.0 | 0.75 |
| m-Cresol | 98 | 1.0 | 1.20 |
| Formic Acid | 204 | 1.0 | 1.20 |
| Acetic Acid | 142 | 2.0 | 1.10 |
| Ethanol | 123 | 8.2 | 1.43 |

As may be seen from the foregoing tabular data, the addition of 1% of the viscosity depressants in all cases not only lowers the apparent viscosity but also makes the solution more nearly Newtonian with respect to the control solution containing no added depressant, i. e., makes the viscosity at varying rates of shear more nearly constant, in this case specifically makes the ratio of the apparent viscosity at 6 R. P. M. to that at 48 R. P. M. more nearly unity.

Although in this specification it has been specifically illustrated that organic compounds of E. D. values greater than 95 can be used in minor amounts in conjunction with other solvents as viscosity depressants in preparing solutions of the alpha-amino acid polyamides, it is also true that these compounds of high E. D. values in some cases in larger amounts serve as solvents for the alpha-amino acid polyamides and in many other instances in relatively large quantities in admixture with non-solvents serve to effect solution. For instance, the copolyamide from a 1:1 by weight mixture of the N-carboanhyrides of DL-leucine and sarcosine (N-methylglycine) which is insoluble in both chloroform and methanol, separately, dissolves readily in a 1:1 by weight mixture of chloroform and methanol.

Although this invention is applicable to alpha-amino acid polymers of various viscosities, its advantages are most important in the case of polyamides having a degree of polymerization above 25 and especially those having a degree of polymerization above 50–60. Such polyamides often produce solutions of extreme viscosity in aromatic hydrocarbon solvents alone, or in halogenated hydrocarbon solvents alone, or in mixtures of these solvents. Such solutions are extremely difficult to handle and make the practical casting of films or spinning of fibers virtually impossible. However, the solvent mixtures of this invention, i. e., those containing a minor amount of at least one organic compound of energy density greater than 95 in conjunction with at least one halogenated hydrocarbon and/or at least one aromatic hydrocarbon, or mixtures thereof, produce easily flowable fluid compositions with the synthetic linear alpha-amino acid polyamides of degree of polymerization greater than 25 which are readily handled by normal solution casting or wet spinning processes to produce useful films and fibers.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A solution, of improved fluidity, of the linear copolyamide, of degree of polymerization of at least 25, of L-leucine and DL-beta-phenylalanine in benzene containing five per cent of m-cresol.

2. A solution, of improved fluidity, of a synthetic linear alpha-amino acid polyamide, of degree of polymerization of at least 25, having recurring chain units of three chain atoms in the arrangement or order, —N—C—CO—, in benzene containing 0.5 to 25.0%, by weight, of m-cresol.

3. A solution, of improved fluidity, of a synthetic linear alpha-amino acid polyamide, of degree of polymerization of at least 25, wherein the amide groups are intralinear, in benzene containing 0.5 to 25.0%, by weight, of a phenol of energy density greater than 95.

4. A solution, of improved fluidity, of a synthetic linear alpha-amino acid polyamide, of degree of polymerization of at least 25, in a liquid aromatic hydrocarbon of boiling point not above 300° C. and containing 0.5 to 25.0%, by weight, of a phenol of energy density greater than 95.

5. A solution, of improved fluidity, of a synthetic linear alpha-amino acid polyamide, of degree of polymerization of at least 25, in a solvent, liquid between 25 and 300° C. and of energy density less than 95, containing 0.5 to 25%, by weight of the solution, of a phenol of energy density greater than 95.

6. A solution, of improved fluidity, of a synthetic linear alpha-amino acid polyamide, of degree of polymerization of at least 25, in a solvent, liquid between 25 and 300° C., of energy density less than 95, and selected from the class consisting of aromatic hydrocarbons and halogenated hydrocarbons, said solution containing 0.5 to 25%, by weight thereof, of a phenol of energy density greater than 95.

7. A solution, of improved fluidity, of a synthetic linear alpha-amino acid polyamide, of degree of polymerization of at least 25, in a solvent, liquid between 25 and 300° C. and of energy density less than 95, containing, dissolved therein, 0.5 to 25%, by weight of the solution, of an organic hydroxyl compound of energy density greater than 95.

8. A solution, of improved fluidity, of a synthetic linear alpha-amino acid polyamide, of degree of polymerization of at least 25, in a solvent, liquid between 25 and 300° C. and of energy density less than 95, containing, dissolved therein, 0.5 to 25%, by weight of the solution, of an organic compound of energy density greater than 95 calories per cubic centimeter.

9. A solution, of improved fluidity, of a synthetic linear alpha-amino acid polyamide in a solvent, liquid between 25 and 300° C., of energy density less than 95, and selected from the class consisting of aromatic hydrocarbons and halogenated hydrocarbons, said solution containing, dissolved therein, 0.5 to 25% by weight thereof, of an organic hydroxyl compound of energy density greater than 95.

10. A solution, of improved fluidity, of a synthetic linear alpha-amino acid polyamide in a solvent, liquid between 25 and 300° C., of energy density less than 95, and selected from the class consisting of aromatic hydrocarbons and halogenated hydrocarbons, said solution containing, dissolved therein, 0.5 to 25% by weight thereof, of an organic compound of energy density greater than 95 calories per cubic centimeter.

JAMES BURTON NICHOLS.

REFERENCES CITED

The following references are of record in the file of this patent:

Page 1888, Chemical and Engineering News, vol. 25, No. 26, June 30, 1947.